US 8,919,679 B2

(12) United States Patent
Matsuo et al.

(10) Patent No.: US 8,919,679 B2
(45) Date of Patent: Dec. 30, 2014

(54) AIR CANNON

(75) Inventors: Noriyoshi Matsuo, Tokyo (JP); Toru Komoriya, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 932 days.

(21) Appl. No.: 12/081,981

(22) Filed: Apr. 24, 2008

(65) Prior Publication Data

US 2008/0264505 A1    Oct. 30, 2008

(30) Foreign Application Priority Data

Apr. 25, 2007  (JP) ................................ P2007-116055

(51) Int. Cl.
    *B05B 1/04*    (2006.01)
    *B60H 3/00*    (2006.01)
    *B60H 1/34*    (2006.01)

(52) U.S. Cl.
    CPC ................ *B60H 1/34* (2013.01); *B60H 3/0007* (2013.01)
    USPC ......................................... 239/592; 239/494

(58) Field of Classification Search
    CPC ........................................................ B05B 7/10
    USPC ......... 239/327, 328, 482, 483, 490, 494, 592, 239/593, 596, 495; 222/135, 145.5
    See application file for complete search history.

(56) References Cited

U.S. PATENT DOCUMENTS

| 1,899,698 | A | * | 2/1933 | Klein | 239/344 |
| 3,421,662 | A | * | 1/1969 | Hanson | 222/95 |
| 5,129,550 | A | * | 7/1992 | Eschbach | 222/135 |
| 5,152,463 | A | * | 10/1992 | Mao et al. | 239/402 |
| 5,275,338 | A | * | 1/1994 | Tobler | 239/327 |
| 5,740,967 | A | * | 4/1998 | Simmons et al. | 239/494 |
| 2004/0255922 | A1 | | 12/2004 | Thorne | |

FOREIGN PATENT DOCUMENTS

| JP | 2000-121139 A | 4/2000 |
| JP | 2000-176339 | 6/2000 |
| JP | 2006-282081 | 10/2006 |
| WO | WO 99/09355 | 2/1999 |

OTHER PUBLICATIONS

Yu, et al., "Air Cannon Design for Projection-Based Olfactory Display," ICAT Dec. 3-5, 2003, pp. 136-142.
Extended European Search Report dated Nov. 17, 2009.
Japanese Office Action dated Sep. 16, 2011.

* cited by examiner

*Primary Examiner* — Davis Hwu
(74) *Attorney, Agent, or Firm* — McGinn IP Law Group, PLLC (57) ABSTRACT

An air cannon is provided with an air cannon body having a cylindrical body partitioning an air chamber and an end plate provided at the cylindrical body, and compression means that is provided at the air cannon body and reduces a volume of the air chamber. In the air cannon, an ejection port having an inner-side opening end and an outer-side opening end that is larger than the inner-side opening end is formed in the end plate. The air inside the air chamber is ejected as air vortexes from the ejection port by driving the compression means.

20 Claims, 10 Drawing Sheets

Comparative Example 1

FIG.5C

Comparative Example 2

FIG. 6A

Present Invention

FIG. 6B

Comparative Example 1

FIG. 6C

Comparative Example 2

FIG. 7A Present Invention
FIG. 7B Comparative Example 1
FIG. 7C Comparative Example 2

11 : Air Gun
14 : Gun Portion
14b : End Plate
18 : Ejection Port
18a : Inner-Side Opening End
18b : Outer-Side Opening End
18c : Tapered Surface
40 : Air Gun
42 : Ejection Port
50 : Air Gun
52 : Ejection Port
V : Ring Vortex

AIR CANNON

CROSS-REFERENCE TO RELATED APPLICATIONS

The disclosure of Japanese Patent Application No. 2007-116055 filed on Apr. 25, 2007 including the specification, drawings, and abstract is incorporated herein by reference in its entirety.

BACKGROUND OF THE INVENTION

1. Field of the Invention

The present invention relates to an air cannon that ejects an air vortex toward the user.

2. Description of the Related Art

A supply device has been suggested that supplies a fragrant component from a blow-out port of an air conditioner to improve the environment inside a vehicle cabin. However, where a fragrant component is supplied from the blow-out port, because the inside of the vehicle cabin is filled with the fragrant component, not only a large amount of fragrant component is necessary, but it is also difficult to provide an atmosphere inside the cabin that pleases each occupant. Accordingly, a supply device has been developed that is equipped with an air cannon that ejects ring vortexes containing a fragrant component toward the occupants (see, for example, Japanese Patent Application Laid-open No. 2006-282081). By this supply device, a fragrant component can be locally supplied and an atmosphere inside the cabin that pleases each occupant can therefore be provided by using a small amount of fragrant component.

As described in Japanese Patent Application Laid-open No. 2006-282081, the air cannon is provided with a container comprising an ejection port, and a diaphragm for changing the volume is incorporated in the container. By deforming the diaphragm with a solenoid or the like, it is possible to compress the air inside the container and eject the air inside the container in the form of ring vortexes from the ejection port. However, because the air cannon is incorporated in the supply device or the like, further miniaturization is needed, and in order to miniaturize such an air cannon, it is important to reduce the size of a solenoid or electric motor serving as a drive source by employing a structure in which air vortexes can fly with good efficiency by using a small amount of energy.

SUMMARY OF THE INVENTION

It is an object of the present invention to miniaturize the air cannon by causing air vortexes to fly with good efficiency.

In accordance with one or more embodiments of the invention, an air cannon is provided with an air cannon body having a cylindrical body partitioning an air chamber and an end plate provided at the cylindrical body, and compression means that is provided at the air cannon body and reduces a volume of the air chamber. In the air cannon, an ejection port having an inner-side opening end and an outer-side opening end that is larger than the inner-side opening end is formed in the end plate, and the air inside the air chamber is ejected as air vortexes from the ejection port by driving the compression means.

In the air cannon, the inner-side opening end may be formed in one surface of the end plate that faces the air chamber, and the outer-side opening end may be formed in the other surface of the end plate.

In the air cannon, the inner-side opening end and the outer-side opening end of the ejection port may be connected via a tapered surface or a curved surface, and the diameter of the ejection port may increase continuously from the inner-side opening end toward the outer-side opening end.

In the air cannon, the ejection port may have a small-diameter port portion having the inner-side opening end and a large-diameter port portion having the outer-side opening end, and the diameter of the ejection port may increase in a stepwise manner from the inner-side opening end toward the outer-side opening end.

In accordance with the present invention, because an ejection port is provided with an inner-side opening end and an outer-side opening end that is larger than the inner-side opening end, the air vortexes can fly with good efficiency from the ejection port. As a result, the compression means can be reduced in size, while maintaining the flying distance of air vortexes, and the air cannon can be miniaturized.

DESCRIPTION OF THE PREFERRED EMBODIMENTS

Figure 1:
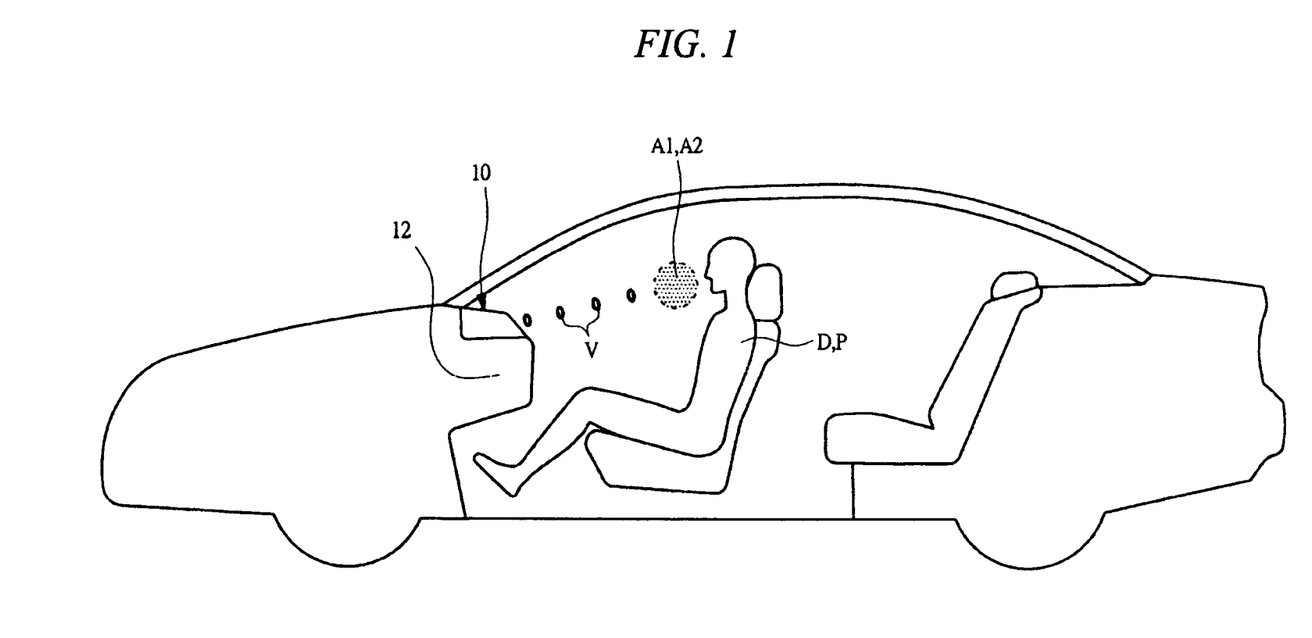
FIG. 1 is an explanatory drawing showing a vehicle carrying a fragrant component supply device.
Figure 2A:
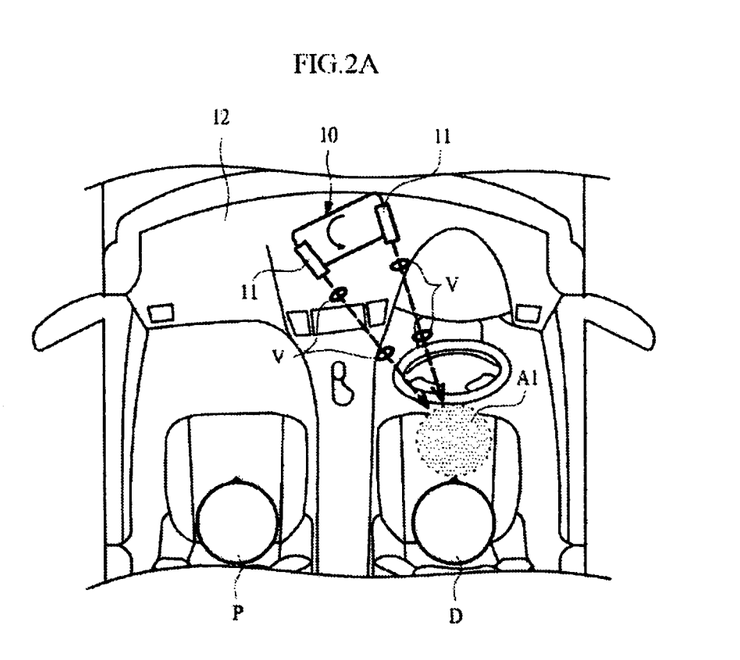
FIGS. 2A and 2B are explanatory drawings illustrating the operation state of the fragrant component supply device.
Figure 2B:
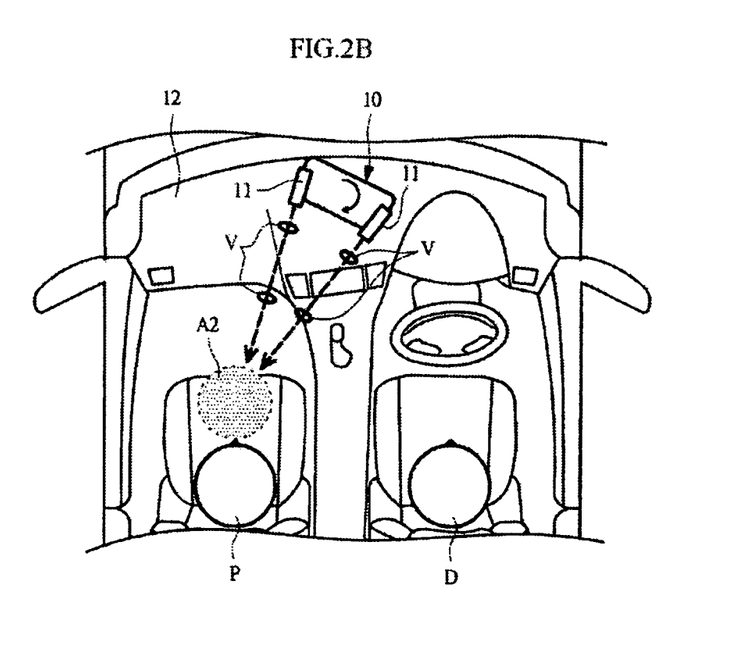

An embodiment of the present invention will be described below in greater detail with reference to the appended drawings. FIG. 1 is an explanatory drawing illustrating a vehicle carrying a fragrant component supply device 10 (referred to hereinbelow as "supply device"). FIGS. 2A and 2B are explanatory drawings illustrating the operation state of the supply device 10. An air cannon 11 that is an embodiment of the present invention is incorporated in the supply device 10 shown in the figure.

As shown in FIG. 1, the supply device 10 that supplies a fragrant component to an occupant D in a driver's seat and an occupant P in a passenger's seat is installed at the instrument panel 12 within the vehicle cabin. As shown in FIGS. 2A and 2B, the supply device 10 incorporates a pair of air cannons 11 that eject air ring vortexes (air vortexes) V containing the fragrant component, and the supply device 10 is installed so that it can be rotated to a position on the driver's seat side and to a position on the passenger's seat side. As shown in FIG. 2A, by rotating the supply device 10 to the position on the driver's seat side, it is possible to supply the fragrant component to the occupant D in the driver's seat. On the other hand, as shown in FIG. 2B, by rotating the supply device 10 to the position on the passenger's seat side, it is possible to supply the fragrant component to the occupant P in the passenger's seat. The ring vortexes V are ejected so as to collide with each other in diffusion regions A1, A2 that are set at the nose tips of the occupants D, P, thereby enabling the diffusion of fragrant component in the diffusion regions A1, A2. Thus, by annihilating the pair of ring vortexes V by such mutual collision, it is possible to supply the fragrant component, without creating an unpleasant feel for the occupants D, P by air pressure.

Figure 3A:
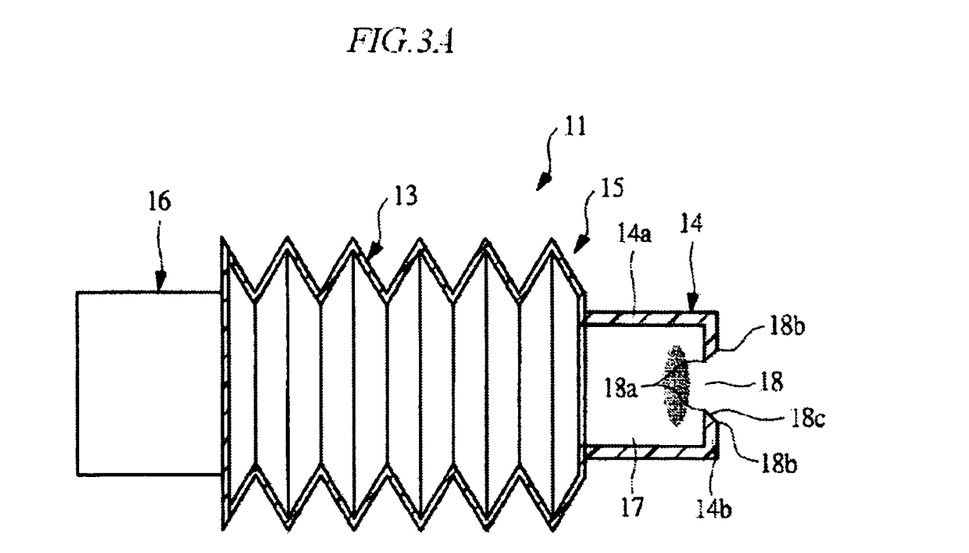
FIGS. 3A and 3B are cross-sectional views illustrating schematically the internal structure of the air cannon.
Figure 3B:
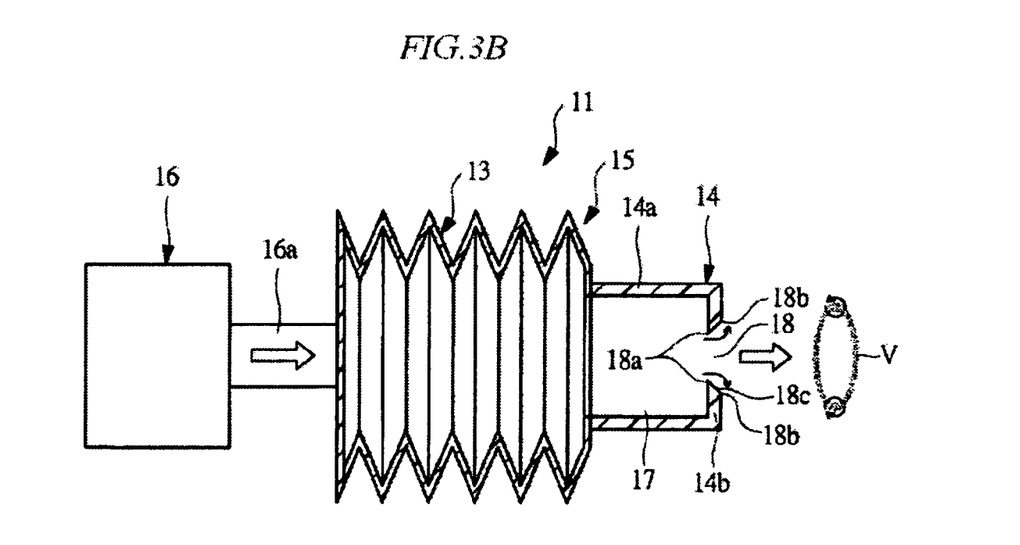
Figure 4:
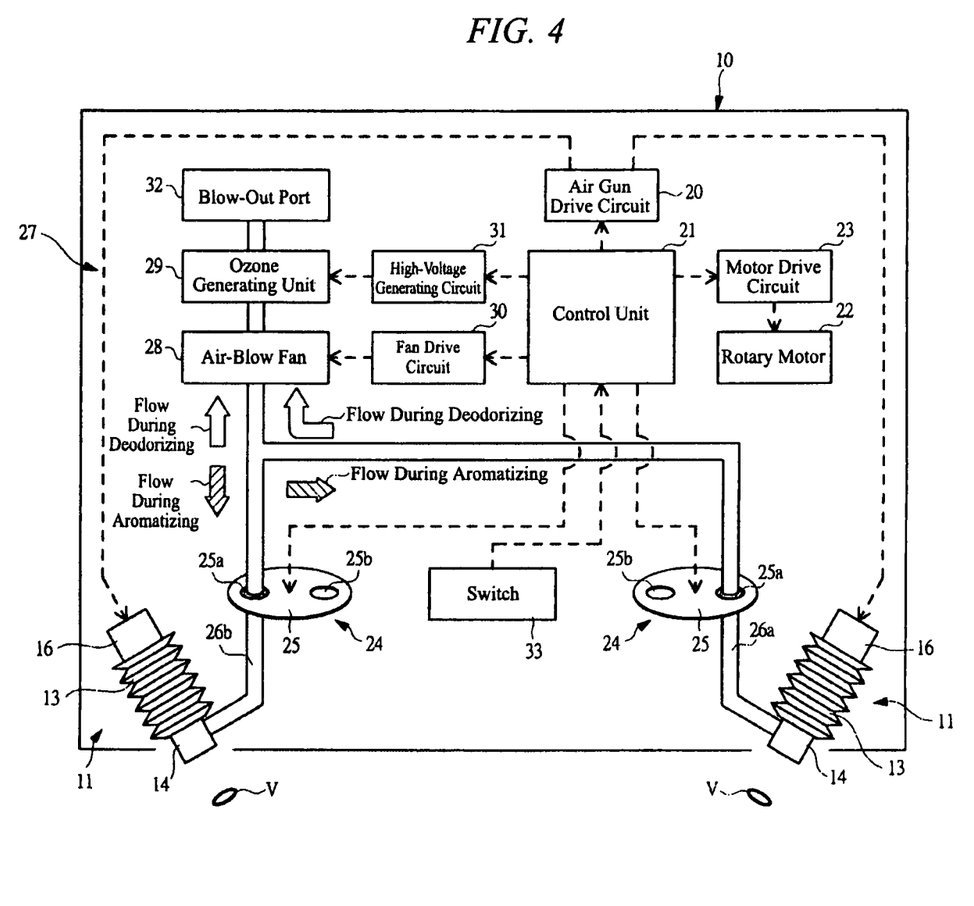
FIG. 4 is a block diagram illustrating the configuration of the fragrant component supply device.

FIGS. 3A and 3B are cross-sectional views illustrating schematically the internal structure of the air cannon 11, and FIG. 4 is a block diagram illustrating the configuration of the supply device 10. As shown in FIGS. 3A and 3B, the air cannon 11 has an air cannon body 15 including a bellows-shaped pump portion 13 that can be expanded and contracted and a cannon portion 14 connected to the pump portion and pump drive portion 16 that is provided at the air cannon body 15 and serves as a compression means for expanding and contracting the pump portion 13. Further, a cylindrical body 14a partitioning an air chamber 17 inside thereof and an end plate 14b attached to the end portion of the cylindrical body 14a are provided in the cannon portion 14 constituting the air cannon body 15, and an ejection port 18 for ejecting the ring vortex V is formed in the end plate 14b. Further, a rod member 16a that can be driven to move back and forth is incorporated in the pump drive unit 16, and this rod member 16a is driven by an electric motor (not shown in the figure) located inside the pump drive portion 16. Further, as shown in FIG. 3B, by pushing the rod member 16a out and contracting the pump portion 13, it is possible to reduce the volume of the air chamber 17 partitioned by the pump portion 13 and cannon portion 14 and to eject the air inside the air chamber 17 in the form of ring vortexes V from the ejection port 18.

As shown in FIG. 4, an air cannon drive circuit 20 that controls the drive current is provided in the supply device 10 in order to drive control the pump drive portion 16 of the air cannon 11, and this air cannon drive circuit 20 is controlled by a signal from the below-described control unit 21. By supplying a drive electric current from the air cannon drive circuit 20 to the pump drive portion 16, it is possible to push out the rod member 16a of the pump drive portion 16 and eject the ring vortex V. Further, a rotary motor 22 is assembled with the supply device 10 in order to rotate the supply device 10 to the position on a driver's seat side and the position on a passenger's seat side. A motor drive circuit 23 that controls the drive current is provided in the supply device 10 in order to supply a drive electric current to the rotary motor 22. The rotary motor 23 is controlled by a signal from the control unit 21.

The supply device 10 is also provided with fragrance supply portions 24 that supply a fragrant component to the air cannons 11, and each fragrance supply portion 24 is provided with a rotary plate 25 comprising a porous body 25a impregnated with the fragrant component. By rotating the rotary plate 25 of the fragrance supply portion 24 and arranging the porous body 25a facing the pipes 26a, 26b, it is possible to supply the fragrant component from the fragrance supply portion 24 to the air cannon 11. Furthermore, through holes 25b are formed in both rotary plates 25, and by controlling the rotary plate 25 so that the through hole 25b is positioned facing the pipes 26a, 26b, it is possible to eject the ring vortexes V of only the air from the air cannon 11. In the fragrance supply portion 24 shown in the figure, the fragrant component is supplied to the air cannon 11 by the diffusion of the fragrant component from the porous body such as a ceramic or a sponge, but such supply structure is not limiting, and the fragrant component can be also supplied by suction that takes the air into the air cannon 11 when the bellows shape of the pump portion 13 of the air cannon 11 is expanded and contracted. Further, the fragrant component also may be supplied to the air cannon 11 by driving reversely a below-described air-blow fan 28 in a state in which no ozone is generated in a below-described ozone generating unit 29, or a pressure pump that pumps the fragrant component into the air cannon 11 may be incorporated.

The supply device 10 is also provided with a deodorizing device 27 for deodorizing or disinfecting the inside of the vehicle cabin. The deodorizing device 27 comprises an air-blow fan 28 and an ozone generating unit 29. A fan drive circuit 30 that controls the drive current is provided in the supply device 10 to supply a drive current to the air-blow fan 28 constituting the deodorizing device 27. The fan drive circuit 30 is controlled by a signal from the control unit 21. The supply device 10 is also provided with a high-voltage generating circuit 31 that controls a high-voltage current for supplying a high-voltage current to the ozone generating unit 29 constituting the deodorizing device 27. The high-voltage generating circuit 31 is controlled by a signal from the control unit 21. The ozone generating unit 29 comprises a needle-shaped discharge electrode and an annular counter electrode (these electrodes are not shown in the figure), and ozone ($O_3$) having a deodorizing effect can be generated by applying a high voltage between the discharge electrode and counter electrode, thereby inducing a silent electric discharge. By driving the air-blow fan 28 in a state in which ozone is generated, it is possible to release the ozone from a blow-out port 32 into the vehicle cabin, thereby enabling the deodorization and disinfection inside the vehicle cabin.

The supply device 10 is provided with the control unit 21 for outputting control signals to the above-described air cannon 11, rotary motor 22, air-blow fan 28, and ozone generating unit 29. The control unit 21 comprises a microprocessor (CPU) that is not shown in the figure, and a ROM, a RAM, and an I/O port are connected via a bus line to the CPU. A control program and various map data are stored in the ROM, and data that are computed by the CPU are temporarily stored in the RAM. Further, a switch 33 or the like that is operated to set the type of the fragrant component or the ejection mode of the ring vortex V is connected to the control unit 21. The control unit 21 controls the ejection state of the ring vortex V based on the control signal from the switch 33.

Figure 5A:
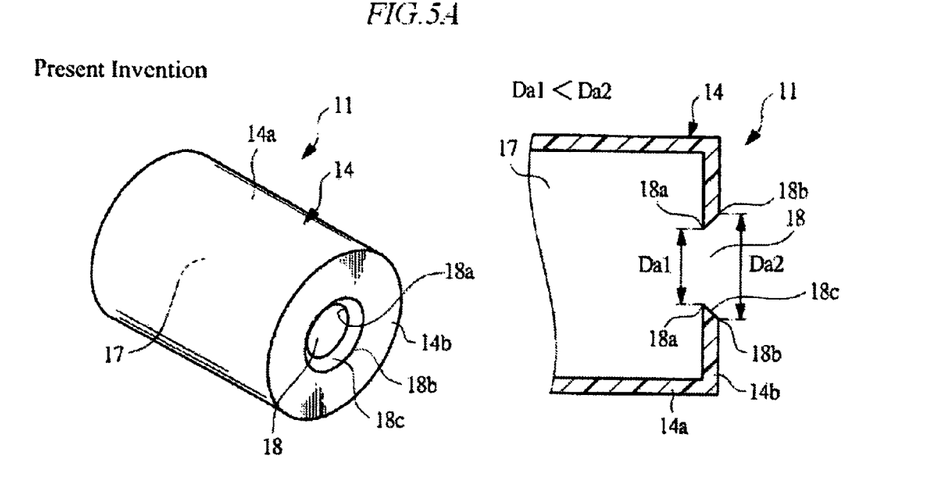
FIG. 5A is a perspective view and a cross-sectional view illustrating the cannon portion of the air cannon that is an embodiment of the present invention.
Figure 5B:
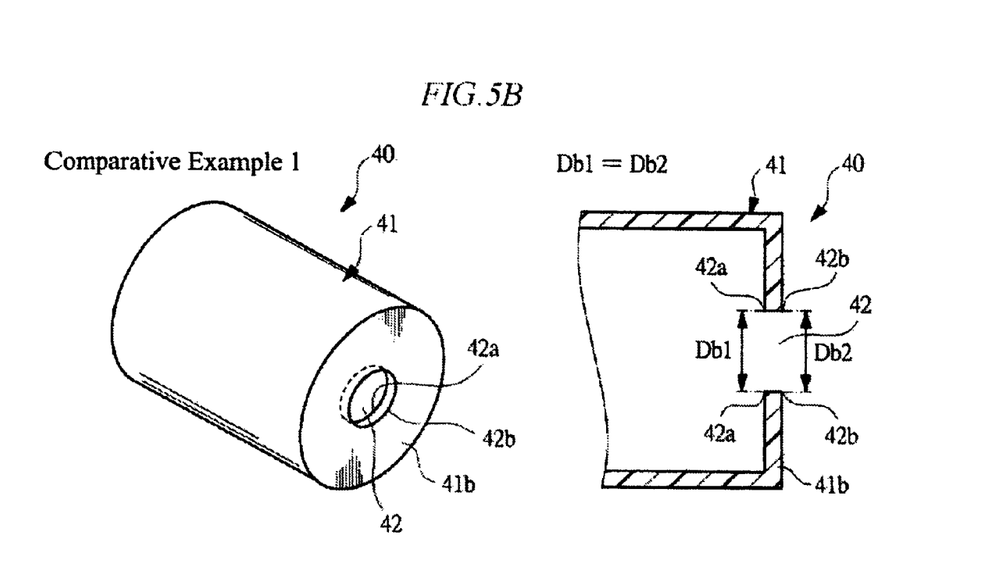
FIGS. 5B and 5C are perspective view and cross-sectional view illustrating the cannon portions of air cannons studied as comparative examples.
Figure 5C:
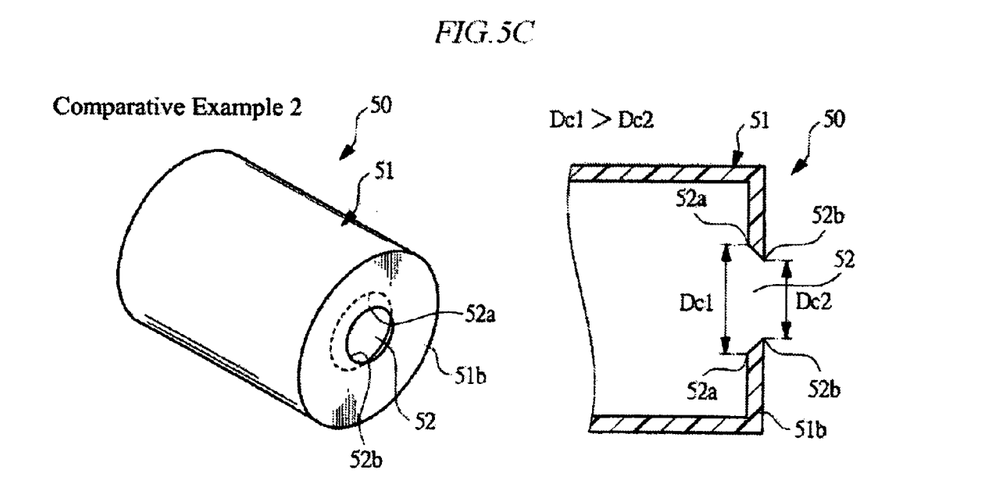

The shape of the ejection port 18 provided in the air cannon 11, which is an embodiment of the present invention, and the ejection performance of the ring vortex V that is attained with such shape of the ejection port will be described below. FIG. 5A is a perspective view and cross-sectional view illustrating the cannon portion 14 of the air cannon 11, which is an embodiment of the present invention. FIGS. 5B and 5C are perspective views and cross-sectional views illustrating cannon portions 41, 51 of air cannons 40, 50 studied as comparative examples. First, as shown in FIG. 5A, a tapered ejection port 18 that expands from inside toward the outside is formed in the end plate 14b provided in the cannon portion 14 of the air cannon 11 in accordance with the present invention. This ejection port 18 comprises a small-diameter (diameter Da1) inner-side opening end 18a formed in one surface of the end plate 14b that faces the air chamber 17 and a large-diameter (diameter Da2) outer-side opening end 18b formed in the other surface of the end plate 14b facing the outside, and these opening ends 18a, 18b are connected via a tapered surface 18c.

The ejection port shapes of two kinds that have been studied as comparative examples will be explained below. As shown in FIG. 5B, an ejection port 42 is formed, so as to maintain a constant diameter Db1, Db2 from the inside toward the outside, in an end plate 41b of the cannon portion 41 of the air cannon 40 serving as Comparative Example 1. In other words, the ejection port 42 comprises an inner-side opening end 42a and an outer-side opening end 42b having identical diameters Db1, Db2. Further, as shown in FIG. 5C, a tapered ejection port 52 is formed to narrow from the inside toward the outside in an end plate 51b of the cannon portion 51 of the air cannon 50 serving as Comparative Example 2. In other words, the ejection port 52 is provided with an inner-side opening end 52a with a diameter Dc1 and an outer-side opening end 52b with a diameter Dc2 smaller than a diameter Dc1.

Figure 6A:
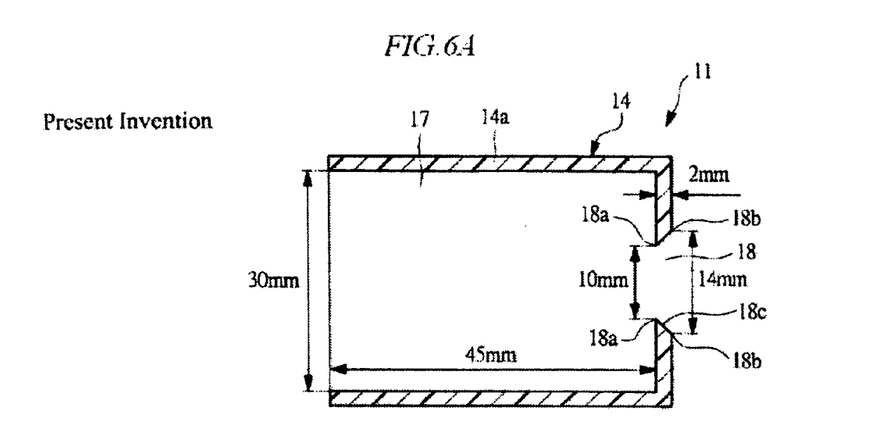
FIGS. 6A to 6C are explanatory drawings illustrating the dimensions of cannon portions that are set to perform simulation.
Figure 6B:
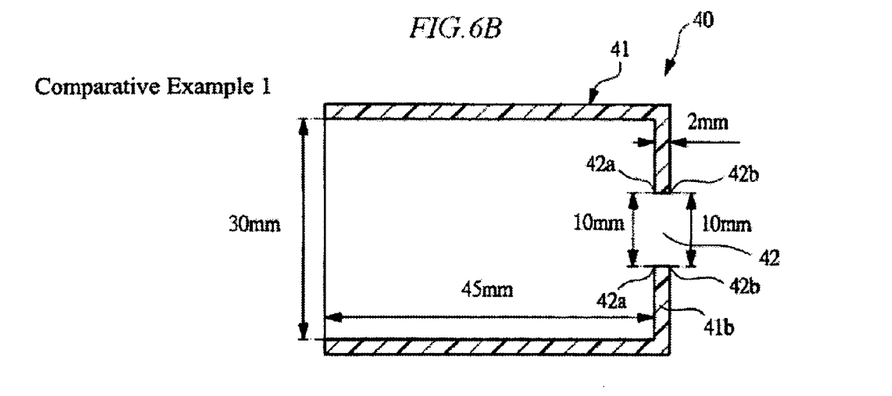
Figure 6C:
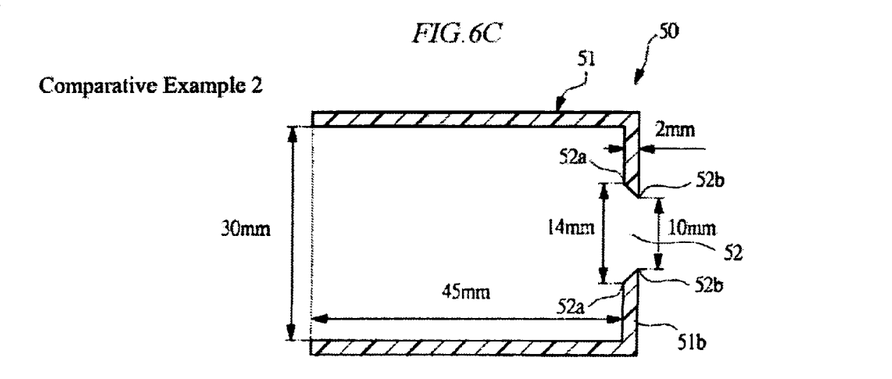

A simulation performed for each shape of the above-described ejection ports 18, 42, 52 will be described below. Here, FIGS. 6A to 6C are explanatory drawings illustrating the dimensions of the cannon portions 14, 41, 51 that are set for performing the simulation. As shown in FIG. 6A, in the cannon portion 14 of the air cannon 11, which is an embodiment of the present invention, the inner diameter of the cannon portion 14 is set to 30 mm, the depth of the cannon portion 14 is set to 45 mm, the sheet thickness of the cannon portion 14 is set to 2 mm, the diameter of the inner-side opening end 18a is set to 10 mm, the diameter of the outer-side opening end 18b is set to 14 mm, and the inclination angle of the tapered surface 18c is set to 45°. Further, as shown in FIG. 6B, the cannon portion 41 of the air cannon 40 serving as Comparative Example 1 comprises the inner-side opening end 42a with a diameter of 10 mm and the outer-side opening end 42b with a diameter of 10 mm, other dimensions being identical to those of the cannon portion 14. As shown in FIG. 6C, the cannon portion 51 of the air cannon 50 serving as Comparative Example 2 comprises the inner-side opening end 52a with a diameter of 14 mm and the outer-side opening end 52b with a diameter of 10 mm, other dimensions being identical to those of the cannon portion 14. The opening ends of the ejection ports 18, 42, 52 shown in FIGS. 6A to 6C have a round shape.

In this simulation, a piston is assumed to be provided inside the cannon portion 14 and a structure is assumed in which the air is pushed out by moving the piston. As for the computation conditions of the simulation, the flow velocity at all the wall surfaces is taken as 0 m/sec, the movement speed of the piston is taken as 1 m/sec, and a stationary state of the air inside the air chamber is taken as the initial state. A general thermal-fluid analysis software is used for the computations.

Figure 7A:
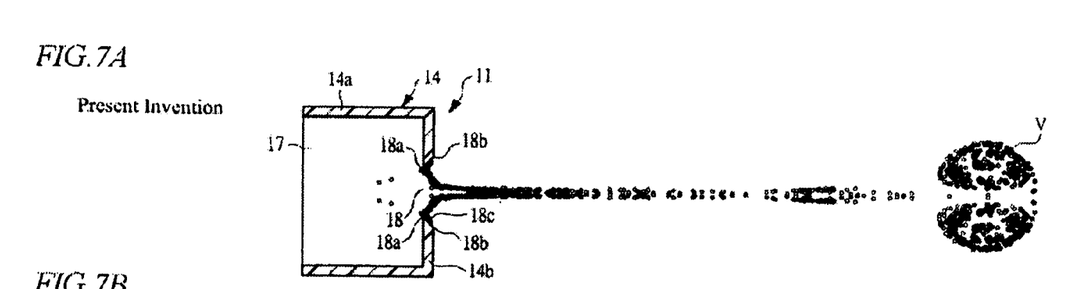
FIGS. 7A to 7C are explanatory drawings illustrating simulation results relating to the ejection state of a ring vortex.
Figure 7B:
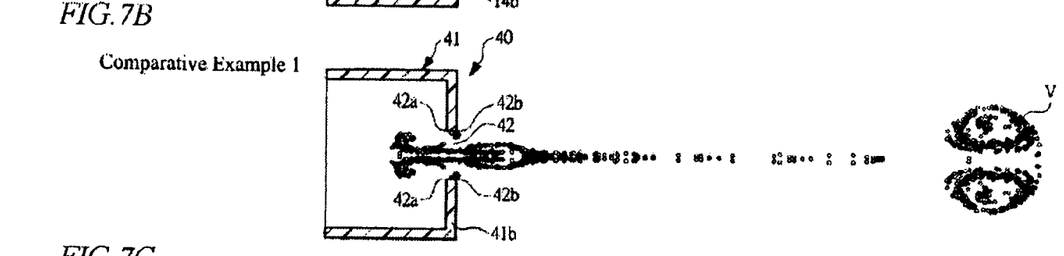
Figure 7C:
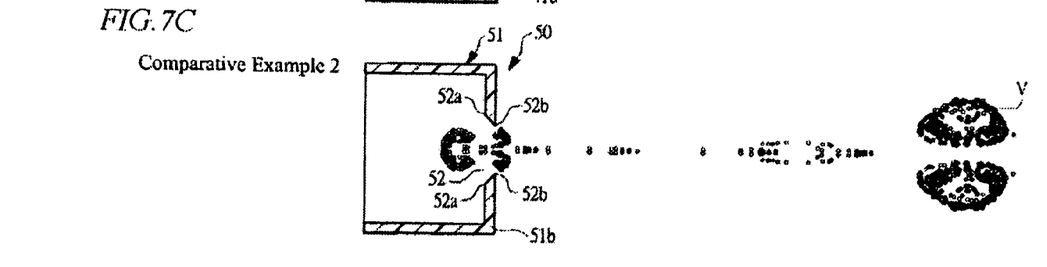
Figure 8:
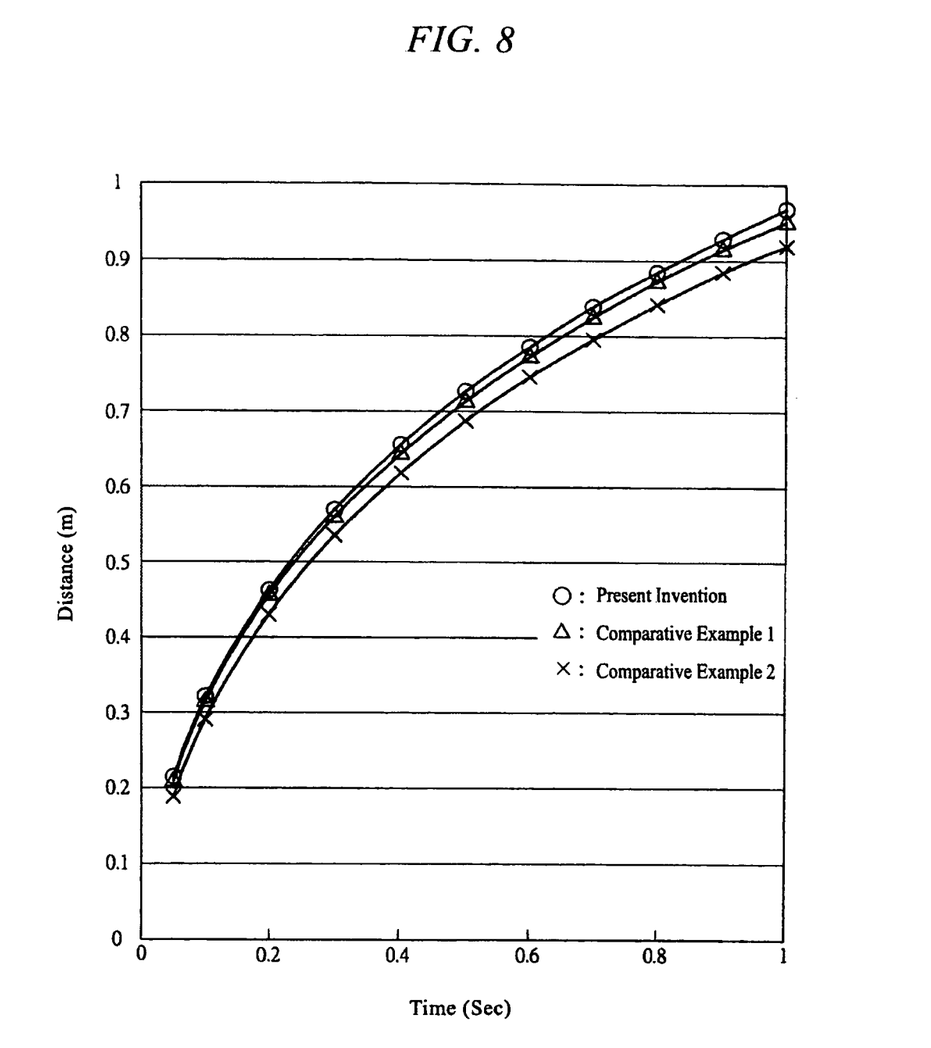
FIG. 8 is a diagram showing the relationship between the flying distance of a ring vortex and the elapsed time that is obtained by simulation.

FIGS. 7A to 7C are explanatory drawings illustrating the simulation results relating to the ejection of the ring vortex V. FIG. 8 is a diagram showing the relationship between the flying distance of the ring vortex V and the elapsed time that is obtained by the simulation. FIG. 7 shows the results of simulation obtained 0.02 sec after the movement of the piston is started. As shown in FIGS. 7 and 8, in the air cannon 11 in accordance with the present invention in which the ejection port 18 expands from the inside toward the outside, the flying distance of the ring vortex V is confirmed to be larger than that in the air cannon 40 of Comparative Example 1 in which the diameter of the ejection port 42 is maintained constant from the inside toward the outside and than that in the air cannon 50 of Comparative Example 2 in which the ejection port 52 is narrowed from the inside toward the outside. As shown in FIGS. 7A to 7C, in the air cannon 11 in accordance with the present invention, the air is confirmed to be better prevented from being blown back into the cannon portions 14, 41, 51 than in the air cannons 40, 50 of Comparative Example 1 and Comparative Example 2.

Thus, the ring vortex V can fly farther with the same energy by forming the ejection port 18 so as to detach the air flow intensively, as shown in FIG. 7A, rather than by setting the shape of ejection ports 42, 52 so as to reduce the flow resistance, as shown in FIGS. 7B and 7C. As a result, because the pump drive portion 16 can be miniaturized, while maintaining the flying distance of the ring vortex V, the air cannon 11 can be miniaturized, while maintaining the ejection performance of the ring vortex V. Further, because the shape of the ring vortex V can be maintained over a long period by forming the ejection port 18 so that it expands from the inside toward the outside, the fragrant component contained in the ring vortex V can be transported to the diffusion regions A1, A2, without diffusion thereof in the intermediate regions, and the fragrant component can be adequately supplied to the occupants.

Figure 9A:
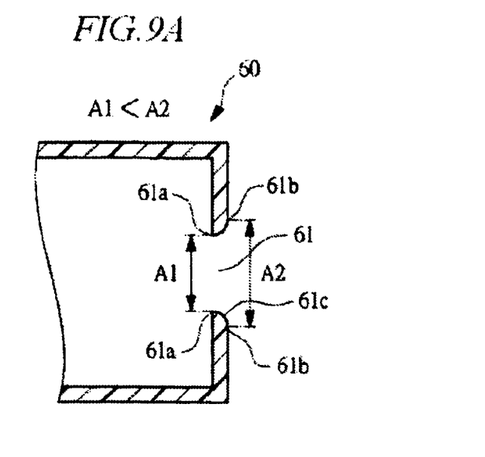
FIGS. 9A to 9E are cross-sectional view illustrating the shape of ejection ports of air cannons of other embodiments of the present invention.
Figure 9B:
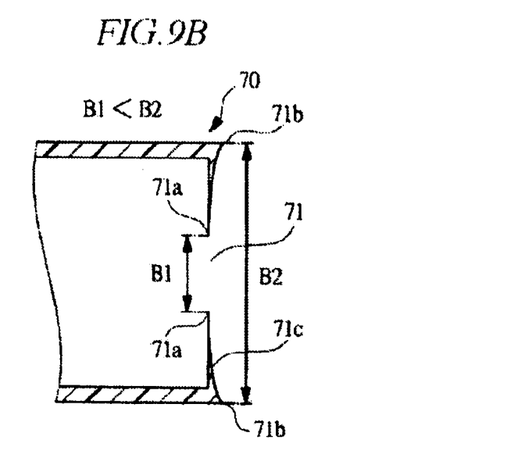

Air cannons 60, 70, 80, 90, 100 that are other embodiments of the present invention will be described below. FIGS. 9A to 9E are cross-sectional views showing the shapes of ejection ports 61, 71, 81, 91, 103 of air cannons 60, 70, 80, 90, 100 that are other embodiments of the present invention. In the ejection port 18 provided in the above-described air cannon 11, the inner-side opening end 18a and outer-side opening end 18b are connected via the tapered surface 18c, but this configuration is not limiting and an inner-side opening end 61a and an outer-side opening end 61b may be connected via a convex curved surface 61c as shown in FIG. 9A, or an inner-side opening end 71a and an outer-side opening end 71b may be connected via a concave curved surface 71c as shown in FIG. 9B.

Figure 9C:
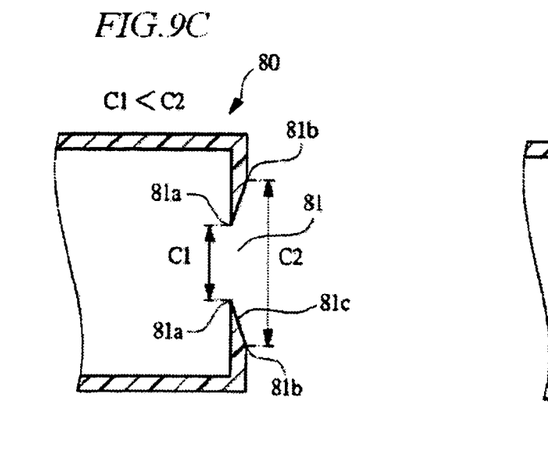
Figure 9D:
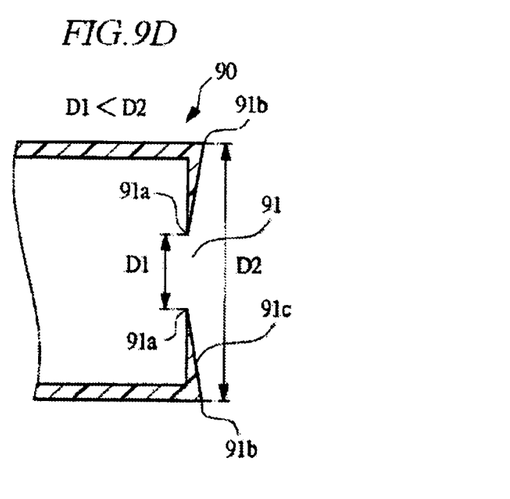
Figure 9E:
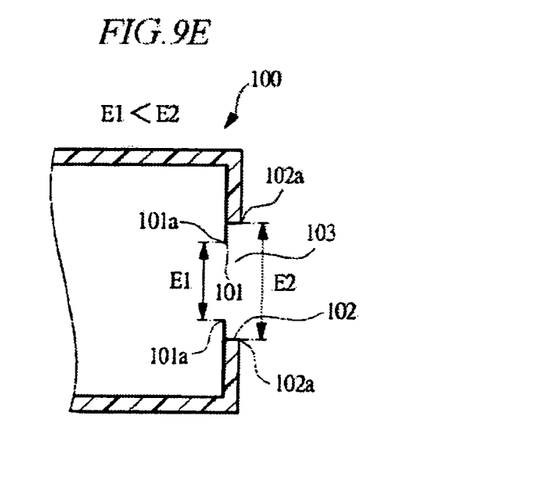

Further, in the ejection port 18 provided in the above-described air cannon 11, the tapered surface 18c with an inclination angle of about 45° is provided, but the configuration is not limited thereto, and ejection ports 81, 91 may be also formed by connecting inner-side opening ends 81a, 91a and outer-side opening ends 81b, 91b by tapered surfaces 81c, 91c comprising a larger inclination angle as shown in FIGS. 9C and 9D. Further, by connecting via the tapered surfaces 18c, 81c, 91c or curved surfaces 61c, 71c, it is possible to enlarge the diameter of ejection ports 18, 61, 71, 81, 91 in a stepwise manner from the inside toward the outside, rather than continuously from the inside toward the outside. In other words, by linking a small-diameter port portion 101 having an inner-side opening end 101a with a large-diameter port portion 102 having an outer-side opening end 102a as shown in FIG. 9E, it is possible to form an ejection port 103 in which the diameter is enlarged in a stepwise manner from the inside toward the outside. Thus, any of the ejection ports 18, 61, 71, 81, 91, 103 that comprise inner-side opening ends 18a, 61a, 71a, 81a, 91a, 101a and larger outer-side opening ends 18b, 61b, 71b, 81b, 91b, 102a can be applied to the air cannons 11, 60, 70, 80, 90, 100 in accordance with the present invention.

The present invention is not limited to the above-described embodiments, and various changes can be made without departing from the essence thereof. For example, in the configuration shown in the figure, the ring vortex V is ejected from the air cannon 11 by driving the electric motor and causing the rod member 16a to protrude, but this ejection structure is not limiting, and the ring vortex V may be also ejected by contracting the pump portion 13 by electromagnetic forces in a configuration in which the air cannon 11 is provided with an electromagnetic coil and a movable magnetic core.

Further, the air cannon 11 is provided with a bellows-shaped pump portion 13, but the air may be also pushed out by providing the air cannon 11 with a diaphragm that partitions the air chamber 17 and deforming the diaphragm. Further, an annular ring vortex V is ejected as the air vortex, but this feature is not limiting, and an air vortex of any shape may be ejected, provided that it can fly through a predetermined distance, while maintaining a definite shape.

The ring vortex V contains a fragrant component, but this feature is not limiting, and a capsaicin component or the like having an awakening effect may be also introduced in the ring vortex V. Further, in the configuration shown in the figure, two air cannons 11 are incorporated in the supply device, but this configuration is not limiting, and one air cannon 11 may be incorporated, or three or more air cannons 11 may be incorporated.

The supply device 10 is rotated to a position on the driver's seat side and to a position on the passenger's seat side, but this configuration is not limited, and the supply device 10 may be fixed to the instrument panel 12. It goes without saying that each air cannon 11 may be rotated to a position on the driver's seat side and to a position on the passenger's seat side.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. An air cannon system, comprising:
    a plurality of air cannons, the air cannons comprising:
        an air cannon body including a cylindrical body partitioning an air chamber and an end plate provided at the cylindrical body;
        compression means that is provided at the air cannon body and reduces a volume of the air chamber; and
        an ejection port formed in the end plate and gradually expanding from an inner-side opening end of the ejection port toward an outer-side opening end of the ejection port, the outer-side opening end being larger than the inner-side opening end, so as to detach an air flow from the ejection port, and air inside the air chamber being ejected as air vortexes from the ejection port by driving the compression means, while maintaining a shape of the air vortexes,
    wherein the ejection port formed in the end plate is disposed on an axis of the cylindrical body,
    wherein the air vortexes comprise air vortex rings,
    wherein an air cannon of the plurality of air cannons is disposed in relation to an other air cannon of the plurality of air cannons such that the air vortexes discharged from the air cannon collide with the air vortexes discharged from the other air cannon at a predetermined position, and
    wherein a periphery of the inner-side opening end in the air chamber is formed in a flat-plate shape.

2. The air cannon system according to claim 1, wherein the inner-side opening end is formed in one surface of the end plate that faces the air chamber, and the outer-side opening end is formed in another surface of the end plate.

3. The air cannon system according to claim 1, wherein the inner-side opening end and the outer-side opening end of the ejection port are connected via a tapered surface or a curved surface, and a diameter of the ejection port increases continuously from the inner-side opening end toward the outer-side opening end.

4. A fragrant component supply device, comprising:
    a plurality of air cannons, the air cannons comprising:
        an air cannon body including a cylindrical body partitioning an air chamber and an end plate provided at the cylindrical body;
        a compression unit that is provided at the air cannon body and reduces a volume of the air chamber; and
        an ejection port formed in the end plate and gradually expanding from an inner-side opening end of the ejection port toward an outer-side opening end of the ejection port, the outer-side opening end being larger than the inner-side opening end, so as to detach an air flow from the ejection port, and air inside the air chamber being ejected as air vortexes from the ejection port by driving the compression unit, while maintaining a shape of the air vortexes; and
    a fragrance supply portion connected to the air cannon;
    wherein a fragrant component is transmitted from the fragrance supply portion through the air cannon and is ejected with the air vortexes,
    wherein the ejection port formed in the end plate is disposed on an axis of the cylindrical body,
    wherein the air vortexes comprise vortex rings,
    wherein an air cannon of the plurality of air cannons is disposed in relation to an other air cannon of the plurality of air cannons such that the air vortexes discharged from the air cannon collide with the air vortexes discharged from the other air cannon at a predetermined position, and
    wherein a periphery of the inner-side opening end in the air chamber is formed in a flat-plate shape.

5. A vehicle, comprising:
    the fragrant component supply device according to claim 4,
    wherein the predetermined position corresponds with an area of the vehicle designated for occupation by an occupant of the vehicle.

6. The fragrant component supply device according to claim 4, further comprising an air fan connected to the air cannon; and
    an ozone-generating unit connected to the air fan.

7. The air cannon system according to claim 1, wherein the inner-side opening end comprises a diameter that is less than a diameter of the outer-side opening end.

8. The fragrant component supply device according to claim 4, wherein the inner-side opening end comprises a diameter that is less than a diameter of the outer-side opening end.

9. The air cannon system according to claim 1, wherein the end plate forms a distal end of the cylindrical body, and
    wherein the inner-side opening end and the outer-side opening end are formed in a wall of the end plate.

10. The air cannon system according to claim 1, wherein the air vortex rings are driven from the ejection port by driving the compression means.

11. The air cannon system according to claim 1, wherein the inner-side opening end and the outer-side opening are disposed on the axis of the cylindrical body.

12. The air cannon system according to claim 1, wherein a portion of the ejection port, between the inner-side opening end and the outer-side opening end, is larger than the inner-side opening end.

13. The air cannon system according to claim 1, wherein an opening of the ejection port, increases in size as the ejection port extends toward the outer-side opening end.

14. The air cannon system according to claim 1, wherein an outermost opening of the ejection port is larger than an innermost opening of the ejection port.

15. The fragrant component supply device according to claim 4, wherein the fragrant supply portion includes a porous body and the fragrant component.

16. An air cannon system, comprising:
 a plurality of air cannons, the air cannons comprising:
  an air cannon body including a cylindrical body partitioning an air chamber and an end plate provided at the cylindrical body;
  compression means that is provided at the air cannon body and reduces a volume of the air chamber; and
  an ejection port formed in the end plate and gradually expanding from an inner-side opening end of the ejection port toward an outer-side opening end of the ejection port, the outer-side opening end being larger than the inner-side opening end, so as to detach an air flow from the ejection port, and air inside the air chamber being ejected as air vortexes from the ejection port by driving the compression means, while maintaining a shape of the air vortexes,
 wherein the ejection port formed in the end plate is disposed on an axis of the cylindrical body,
 wherein the air vortexes comprise air vortex rings,
 wherein an air cannon of the plurality of air cannons is disposed in relation to an other air cannon of the plurality of air cannons such that the air vortexes discharged from the air cannon collide with the air vortexes discharged from the other air cannon at a predetermined position, and
 wherein the air cannon system further comprises an air fan connected so as to expel air from the ejection port.

17. The air cannon system according to claim 1, wherein a portion of the end plate, located on the inner side of the air chamber, is devoid of a taper shape.

18. The air cannon system according to claim 1, wherein an entirety of a portion of the end plate, on the inner side of the air chamber, has the flat-plate shape.

19. The air cannon system according to claim 1, further comprising an air fan that expels air from the ejection port.

20. The fragrant component supply device according to claim 4, further comprising an air fan that expels air from the ejection port.

* * * * *